(12) United States Patent  
Paidimarri et al.

(10) Patent No.: US 12,381,321 B2  
(45) Date of Patent: Aug. 5, 2025

(54) DISTRIBUTED CALCULATION OF BEAMFORMING PARAMETERS FOR PHASED ARRAYS

(71) Applicant: International Business Machines Corporation, Armonk, NY (US)

(72) Inventors: Arun Paidimarri, White Plains, NY (US); Mark Yeck, Bloomingdale, NJ (US); Bodhisatwa Sadhu, Peekskill, NY (US); Alberto Valdes Garcia, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 17/467,527

(22) Filed: Sep. 7, 2021

(65) Prior Publication Data

US 2023/0075523 A1   Mar. 9, 2023

(51) Int. Cl.  
  *H01Q 3/38* (2006.01)  
  *H04B 7/06* (2006.01)

(52) U.S. Cl.  
  CPC ............. *H01Q 3/38* (2013.01); *H04B 7/0617* (2013.01)

(58) Field of Classification Search  
  CPC .................. H01Q 3/38; H04B 7/0617  
  See application file for complete search history.

(56) References Cited

U.S. PATENT DOCUMENTS

| 5,235,342 | A | * | 8/1993 | Orton | ............. | H01Q 21/22 343/703 |
| 5,771,016 | A | * | 6/1998 | Mullins | ............. | H01Q 3/2605 342/372 |
| 6,144,339 | A | * | 11/2000 | Matsumoto | ......... | H01Q 21/0025 342/361 |

(Continued)

FOREIGN PATENT DOCUMENTS

| CN | 101860779 A | 10/2010 |
| CN | 110518947 A | 11/2019 |

(Continued)

OTHER PUBLICATIONS

International Search Report and Written Opinion dated Dec. 7, 2022, received in a corresponding foreign application, 12 Pages.

(Continued)

*Primary Examiner* — William Kelleher  
*Assistant Examiner* — Noah Yi Min Zhu  
(74) *Attorney, Agent, or Firm* — Scully, Scott, Murphy & Presser, P.C.; Kimberly Zillig (57) ABSTRACT

Systems and methods for operating a phased array are described. In an example, a system may convert a desired beam direction of a desired beam into at least one phase slope parameter. The phased array may include a plurality of antennas connected to a plurality of front-end circuits of a beam forming circuit, and each antenna may be connected to a respective front-end circuit. For each antenna among the plurality of antennas, the system may determine a phase shift parameter of the antenna based on the at least one phase (Continued)

slope parameter and a physical location of the antenna. For each antenna among the plurality of antennas, the system may map the determined phase shift parameter of the antenna to control settings for a front-end circuit connected to the antenna.

20 Claims, 8 Drawing Sheets

(56) References Cited

U.S. PATENT DOCUMENTS

| | | | |
|---|---|---|---|
| 6,218,985 B1* | 4/2001 | Adams | H01Q 3/26 |
| | | | 342/372 |
| 6,657,590 B2 | 12/2003 | Yoshida | |
| 8,618,983 B2 | 12/2013 | Chen et al. | |
| 9,160,433 B2 | 10/2015 | Liu et al. | |
| 9,257,746 B2 | 2/2016 | Chen et al. | |
| 9,462,599 B2 | 10/2016 | Gao et al. | |
| 9,640,866 B2 | 5/2017 | Kumar | |
| 10,003,129 B2 | 6/2018 | Wang et al. | |
| 10,439,284 B2 | 10/2019 | Wang et al. | |
| 10,512,061 B2 | 12/2019 | Islam et al. | |
| 10,630,936 B2 | 4/2020 | Chen | |
| 10,743,319 B2 | 8/2020 | Ding et al. | |
| 10,750,377 B1* | 8/2020 | Zihir | H04W 16/28 |
| 10,985,819 B1* | 4/2021 | Durbin | H04B 7/0617 |
| 11,005,581 B1* | 5/2021 | Gomadam | H04B 17/12 |
| 11,205,858 B1* | 12/2021 | Durbin | H01Q 3/28 |
| 2003/0095066 A1 | 5/2003 | Brogden | |
| 2010/0073233 A1* | 3/2010 | Young | H01Q 21/064 |
| | | | 342/373 |
| 2012/0326781 A1 | 12/2012 | Mori et al. | |
| 2014/0210668 A1 | 7/2014 | Wang et al. | |
| 2017/0187109 A1 | 6/2017 | Wang et al. | |
| 2019/0305805 A1* | 10/2019 | Henry | H04B 1/04 |
| 2020/0067185 A1* | 2/2020 | O'Leary | H01Q 3/28 |
| 2022/0045772 A1* | 2/2022 | El-Hassan | H04B 17/13 |
| 2022/0085767 A1* | 3/2022 | Abbasi | H03F 1/223 |
| 2023/0155286 A1* | 5/2023 | Rexberg | H04B 7/0634 |
| | | | 343/702 |
| 2023/0282976 A1* | 9/2023 | Kobayashi | H01Q 3/40 |
| | | | 342/372 |

FOREIGN PATENT DOCUMENTS

| | | |
|---|---|---|
| KR | 10-2230659 B1 | 3/2021 |
| WO | 2006/069488 A1 | 7/2006 |

OTHER PUBLICATIONS

Sadhu, B., et al., "A 28-GHz 32-Element TRX Phased-Array IC With Concurrent Dual-Polarized Operation and Orthogonal Phase and Gain Control for 5G Communications", IEEE Journal of Solid-State Circuits, Dec. 2017, pp. 3373-3391, vol. 52, No. 12.

Valedez-Garcia, A., et al., "A Fully Integrated 16-Element Phased-Array Transmitter in SiGe BiCMOS for 60-GHz Communications", IEEE Journal of Solid-State Circuits, Dec. 2010, pp. 2757-2773, vol. 45, No. 12.

Valedez-Garcia, A., et al., "A fully-integrated dual-polarization 16-element W-band phased-array transceiver in SiGe BiCMOS", 2013 IEEE Radio Frequency Integrated Circuits Symposium, Jun. 2013, pp. 375-378.

Sadhu, B., et al., "The More (Antennas), the Merrier: A Survey of Silicon-Based Mm-Wave Phased Arrays Using Multi-IC Scaling." IEEE Microwave Magazine, Dec. 2019, pp. 32-50.

* cited by examiner

| -7,-7 | -7,-5 | -7,-3 | -7,-1 | -7,1 | -7,3 | -7,5 | -7,7 |
|---|---|---|---|---|---|---|---|
| -5,-7 | -5,-5 | -5,-3 | -5,-1 | -5,1 | -5,3 | -5,5 | -5,7 |
| -3,-7 | -3,-5 | -3,-3 | -3,-1 | -3,1 | -3,3 | -3,5 | -3,7 |
| -1,-7 | -1,-5 | -1,-3 | -1,-1 | -1,1 | -1,3 | -1,5 | -1,7 |
| 1,-7 | 1,-5 | 1,-3 | 1,-1 | 1,1 | 1,3 | 1,5 | 1,7 |
| 3,-7 | 3,-5 | 3,-3 | 3,-1 | 3,1 | 3,3 | 3,5 | 3,7 |
| 5,-7 | 5,-5 | 5,-3 | 5,-1 | 5,1 | 5,3 | 5,5 | 5,7 |
| 7,-7 | 7,-5 | 7,-3 | 7,-1 | 7,1 | 7,3 | 7,5 | 7,7 |

DISTRIBUTED CALCULATION OF BEAMFORMING PARAMETERS FOR PHASED ARRAYS

FIELD

The present application relates to antennas, phased arrays, beamforming, integrated circuits and programs, and to computer-implemented methods and systems relating to phased array systems.

BACKGROUND

A phased array system may include a beam forming integrated circuit (IC) and a plurality of antennas. The phased array system may use a plurality of antenna signal paths, where each antenna signal path may have a variable time delay. For phase array systems being implemented as receivers (or receiver channels in a transceiver), the beam forming circuit may use propagation delay produced by the variable time delay in each antenna signal path of signals being received by the phased array so that higher receiver gain is achieved for signals arriving from a specific direction. For phase array systems being implemented as transmitters (or transmission channels in a transceiver), the beam forming circuit may control time delay difference between successive antenna signal paths of the plurality of antennas to generate an electromagnetic beam having specific direction. The beam forming IC may use the changes in the time delay different to steer the electromagnetic beam to different directions.

SUMMARY

In some examples, a method for operating a phased array is generally described. The method may include converting a desired beam direction of a desired beam into at least one phase slope parameter. The phased array may include a plurality of antennas connected to a plurality of front-end circuits of a beam forming circuit, and each antenna may be connected to a respective front-end circuit. The method may further include, for each antenna among the plurality of antennas, determining a phase shift parameter of the antenna based on the at least one phase slope parameter and a physical location of the antenna. The method may further include, for each antenna among the plurality of antennas, mapping the determined phase shift parameter of the antenna to control settings for a front-end circuit connected to the antenna.

In some examples, a system for operating a phased array is generally described. The system may include a first device, a phased array, and a second device connected to the first device and the plurality of front-end circuits. The phased array may include a plurality of antennas connected to a plurality of front-end circuits of a beam forming circuit. The first device may be configured to convert a desired beam direction of a desired beam into at least one phase slope parameter. The first device may be further configured to send the at least one phase slope parameter to the second device. The second device may be configured to receive the at least one phase slope parameter. The second device may be further configured to, for each antenna among the plurality of antennas, determine a phase shift parameter of the antenna based on the at least one phase slope parameter and a physical location of the antenna. The second device may be further configured to, for each antenna among the plurality of antennas, map the determined phase shift parameter of the antenna to control settings for a front-end circuit connected to the antenna.

In some examples, an apparatus for operating a phased array is generally described. The apparatus may include a plurality of antennas and a beam forming circuit including a plurality of front-end circuits connected to the plurality of antennas. The beam forming circuit may be configured to receive at least one phase slope parameter from a device. The at least one phase slope parameter being based on a desired beam direction of a desired beam. The beam forming circuit may be further configured to, for each antenna among the plurality of antennas, determine a phase shift parameter of the antenna based on the at least one phase slope parameter and a physical location of the antenna. The beam forming circuit may be further configured to, for each antenna among the plurality of antennas, map the determined phase shift parameter of the antenna to control settings for a front-end circuit connected to the antenna.

Further features as well as the structure and operation of various embodiments are described in detail below with reference to the accompanying drawings. In the drawings, like reference numbers indicate identical or functionally similar elements.

DETAILED DESCRIPTION

Traditionally, digital control circuits for phased array front-ends (e.g., digital control circuits for controlling parameters such as gain and phase) may each include an on-chip memory beam table, where each row of the beam table stores settings that corresponds a given beam direction. However, as the number of antenna elements in a phased array grows, beamwidth may become narrower and more beam directions are required to cover a region of interest in space. Thus, these beam tables may become larger and beam finding algorithms may need to search through a much larger number of entries in the beam tables. For example, smaller phased arrays (e.g., 16 antenna elements with approximately 20 degree beamwidth) may have relatively less entries in each beam table for each front-end circuit (e.g., less than 100 entries). However, large phase arrays (e.g., greater than or equal to 256 antennas) may have a large number of entries in each beam table for each front-end circuit. For example, a phased array with 1024 antennas with 1 degree beamwidth may have approximately 2,000 entries in each lookup table for each front-end circuit, making it impractical to search through the lookup table and requiring a relatively large on-chip area for the implementation of these lookup tables.

Figure 1A:
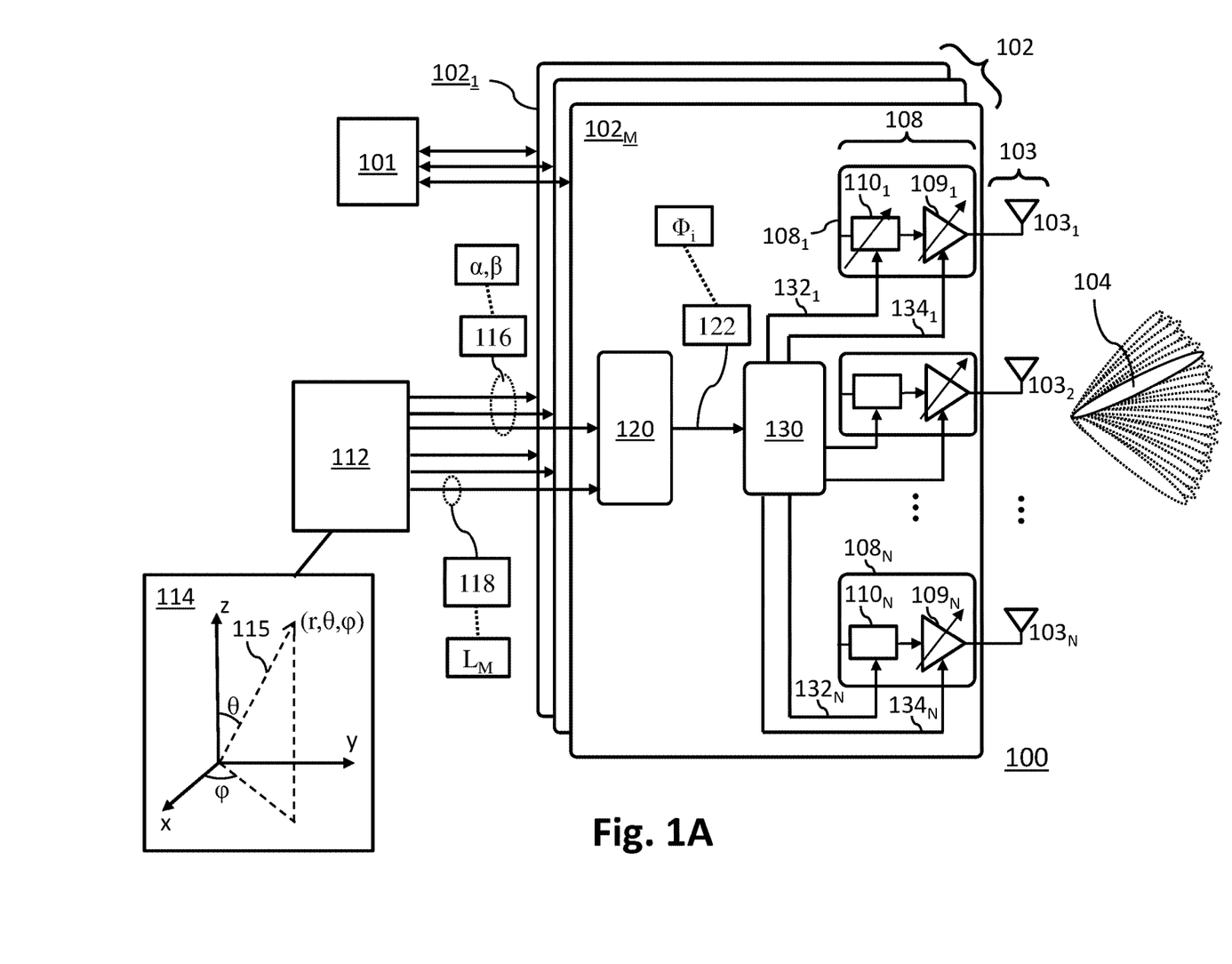
FIG. 1A illustrates an example system that can implement distributed calculation of beamforming parameters for phased arrays in one embodiment.

FIG. 1A illustrates an example system that can implement distributed calculation of beamforming parameters for phased arrays in one embodiment. The system 100 can be a radio frequency (RF) transmission system implemented by a communication device, such as a RF transmitter, a RF receiver, or a RF transceiver. The system 100 can be configured to operate at common wireless radio frequencies, millimeter-wave frequencies, and/or microwave frequencies. The system 100 can be a part of a wireless communication network, such as fourth generation (4G) wireless communications system, fifth generation (5G) wireless communications system, satellite communication system, point-to-point communications systems such as common data link, and/or other types of wireless communication networks.

The system 100 can include a circuit 101, one or more beam forming integrated circuits (ICs) 102, a plurality of antennas 103, and a circuit 112. The one or more beam forming ICs 102 and the plurality of antennas 103 may form a phased array system. The circuit 101 can be a part of a RF communication device such as a radio frequency (RF) transmitter, a RF receiver, a transmission channel of a RF transceiver, or a receiver channel of a RF transceiver. For example, the circuit 101 can include a baseband processor, mixer circuits such as up-down converters, filters, memory devices, local oscillators, digital-to-analog converters (DAC) (if the circuit 101 is a RF transmitter, or a transmission channel of a RF transceiver), analog-to-digital converters (ADC) (if the circuit 101 is a RF receiver, or a receiver channel of a RF transceiver), signal generators, microcontrollers, and/or other types of components or integrated circuits that belong to a RF communication device. The circuit 101 shown in FIG. 1A can be configured to output RF signals to the beam forming ICs 102 when the phased array system is intended to operate as a transmitter. In examples where the circuit 101 is part of a RF transceiver or receiver, the circuit 101 can also be configured to receive RF signals from the beam forming ICs 102. The RF signals being exchanged between the circuit 101 and the beam forming ICs 102 can be radio-frequency, millimeter-wave frequency, or microwave frequency signals that can carry information or data.

The plurality of antennas 103 may include a plurality of antennas, such as antennas $103_1$ to $103_N$. Each antenna among the antennas 103 may output a RF signal having a respective amplitude and phase. In an example, the system 100 can include M beam forming ICs 102 that may be identical to one another. Using a beam forming IC $102_M$ as an example, the beam forming IC $102_M$ may include a circuit 120, a mapper 130, and a plurality of front-end circuits 108. Each one of the beam forming ICs 102 may include N front-end circuits 108, including front-end circuits $108_1$ to $108_N$. Each front-end circuit 108 may include a respective set of components, such as power amplifiers, gain control circuits, phase shifters, and/or other types of components or ICs that can implement different beamforming techniques. For example, the front-end circuit $108_1$ may include a gain control circuit $109_1$ and a phase shifter $110_1$, and the front-end circuit $108_N$ may include a gain control circuit $109_N$ and a phase shifter $110_N$. Further, each front-end circuit may be connected to an antenna among the plurality of antennas 103. A phase shift control setting may be inputted to each phase shifter, among phase shifters $110_1$ to $110_N$, to control the phase of a RF signal being outputted by a connected antenna. A gain control setting may be inputted to each gain control circuit, among gain control circuits $109_1$ to $109_N$, to control the gain of a RF signal being outputted by a connected antenna. Beam steering may be implemented by adjusting the phase shifter (e.g., phase shifter $110_1$ to $110_N$) in each one of the front-end circuits 108. The phase delays across the front-end circuits 108 may produce an interference pattern that can focus a beam in a specific direction. The beam 104 may have a field pattern and beam direction that can be based on the gain and phase parameters being set in the front-end circuits 108.

In an example, the system 100 may generate a desired beam 104 having a desired beam direction 115 and a desired amplitude r (see coordinate system 114 in FIG. 1A). To generate the desired beam 104, the circuit 112 may first determine a set of phase slope parameters 116. In an example, the circuit 112 may be a device including components such as a field programmable gate array (FPGA) chip, or a processor such as a central processing unit (CPU) of a computing device configured to determine the set of phase slope parameters 116. The set of phase slope parameters 116 may include a first phase slope parameter denoted as α, and a second phase slope parameter denoted as β. The circuit 112 may determine the set of phase slope parameters 116 based on a beam angle of the desired beam direction 115, a wavelength of the desired beam 104, and spacing between the plurality of antennas 103. The beam angle of the desired beam direction 115 may include angular components θ and φ. The circuit 112 may determine the phase slope parameter α based on θ and φ, a wavelength λ of the desired beam 104, and a minimum unit spacing between the plurality of antennas 103 in the x-direction, denoted as dx. The circuit 112 may determine the phase slope parameter β based on θ and φ, a wavelength λ of the desired beam 104, and a minimum unit spacing between the plurality of antennas 103 in the y-direction, denoted as dy. In an example, the following expressions may represent the relationships among α, β, θ, φ, λ, dx, and dy:

$$\alpha = dx\sin(\theta)\cos(\varphi)\frac{360°}{\lambda}$$

$$\beta = dy\sin(\theta)\sin(\varphi)\frac{360°}{\lambda}$$

In an example, the set of specific N locations 118 of the antennas 103 supported by each beamforming IC $102_M$ can be represented as a matrix $L_M$ that contains a pair of coordinates $\eta_x$, $\eta_y$ for each of the N antennas.

The set of phase slope parameters 116 may be inputted to each one of the beam forming ICs 102. In addition, the set of antenna locations 118 may be inputted to each corresponding beamforming IC $102_M$. In an example, the circuit 112 may broadcast the set of phase slope parameters 116 to the beam forming ICs 102. The circuit 120 of each beam forming IC 102 may receive the set of phase slope parameters 116 from the circuit 112. The circuit 120 of each beam forming IC may receive the set of N antenna locations 118 from the circuit 112. The circuit 120 of the beam forming IC 102 may be configured to determine a phase shift parameter 122, denoted as $\Phi_i$, for each i-th antenna among the plurality of antennas 103, where i=1 . . . N. In an example, the phase shift parameter 122 may be an ideal phase shift required for a connected front-end circuit or antenna. For example, the phase shift parameter $\Phi_i$ for the i-th antenna may be an ideal phase shift required for the i-th antenna to contribute to forming the desired beam 104 in the desired beam direction 105. The circuit 120 may determine the phase shift parameter 122 for each antenna based on the set of phase slope parameters 116 and a physical location of the corresponding antenna. For example, the circuit 120 may determine $\Phi_i$ for antenna $103_1$ based on $\alpha$, $\beta$, and a physical location of the antenna $103_1$. The circuit 120 may send the phase shift parameter 122 to the mapper 130. In an example, the following expressions may represent the relationships among $\alpha$, $\beta$, and $\Phi_i$:

$$\Phi_{xy} = \eta_x \alpha + \eta_y \beta$$

where $\Phi_{xy}$ denotes a i-th antenna located at a point (x,y) on a x-y plane (see coordinate system 114), $\eta_x$ denotes the location of the i-th antenna in the x direction, and $\eta_y$ denotes the location of the i-th antenna in the y direction.

Note that the circuit 112 may be implemented off-chip (e.g., outside of the beam forming ICs 102), such that the calculation or determination of the set of phase slope parameters 116 may be performed off-chip. The calculation or determination of the phase shift parameter 122 may be performed by the circuit 120 in the beam forming ICs 102. By offloading the calculation of the set of phase slope parameters 116 to the circuit 112, the beam forming ICs may consume relatively less power because the nonlinear nature of the calculation of the set of phase slope parameters 116 may require more power than linear calculations (e.g., calculation of the phase shift parameter 122). For example, the calculations of the set of phase slope parameters 116 may be trigonometric, and frequency-dependent. By offloading the calculation of the set of phase slope parameters 116 to the circuit 112, the beam forming ICs (e.g., beam forming ICs 102) may require less area and the overall calculations may be performed faster.

Note that performing the calculation of the set of phase slope parameters 116 based on a minimum unit antenna spacing (with an accuracy only limited by the number of bits used for its representation) and performing the calculation of the phase shift parameter 122 based on specific antenna locations 188 enables supporting a large variety of antenna array configurations, including configurations in which the antennas are not placed on a grid with uniform spacing.

Note further that while the set of calculations to determine the set of phase slope parameters 116 depends on the desired beam direction 115 (e.g. a separate calculation is required for each beam direction), the set of N antenna locations 118 is not expected to change dynamically. Therefore, in an example, each set of N antenna locations 118 is inputted into the corresponding beamforming IC $102_M$ only once during system initialization In an example, the mapper 130 may be a circuit including one or more of processing elements, lookup tables, memory devices, and/or ICs such as decoders. The mapper 130 may be configured to map each $\Phi_i$ to different control settings for the front-end circuits 108. For example, the mapper 130 may map $\Phi_1$ to a control setting including a gain control setting $132_1$ and a phase shift control setting $134_1$, and may input the control settings $132_1$, $134_1$, to the front-end circuit $108_1$. In an example, the mapper 130 may include a lookup table storing associations between different values of $\Phi_i$ and different control settings (e.g., different values of phase and gain control settings). In another example, the mapper 130 may include multiple lookup tables, such as one lookup table for each front-end circuit 108, storing associations between different values of $\Phi_i$ for an i-th antenna and different control settings. In another example, the mapper 130 may implement static random access memory (SRAM) devices to store the associations. The different control settings being mapped to the front-end circuits 108 may configure the plurality of antennas 103 to generate the desired beam 104.

Figure 1B:
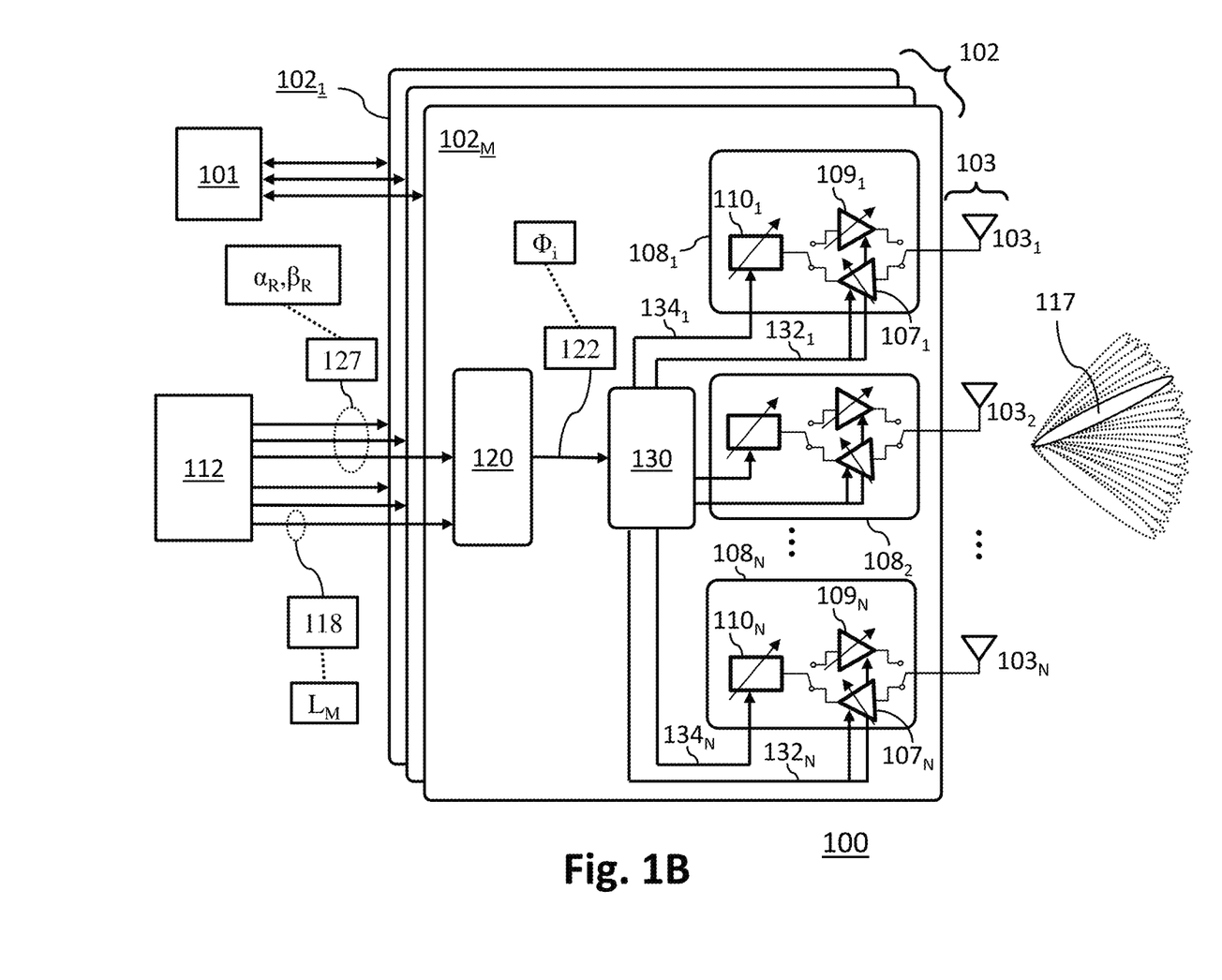
FIG. 1B illustrates another example system that can implement distributed calculation of beamforming parameters for phased arrays in one embodiment.

Another example embodiment of the system 100 is shown in FIG. 1B. In the example shown in FIG. 1B, the antennas 103 may form a receiver beam 117, and each antenna among the antennas 103 may receive an RF signal. The front-end circuits 108 may further include components of a receiver channel, such as a band-pass filter for reducing image response, an RF amplifier or low-noise amplifier (LNA) for amplifying weak signals without contaminating them with noise, a local oscillator (LO) for generating an LO signal to be mixed with RF signals received in the direction of beam 117, and a mixer that mixes the LO signal with the RF signals received in the direction of beam 117. For simplicity purposes, FIG. 1B shows RF amplifiers $107_1$, $107_2$, $107_N$ in the front-end circuits $108_1$, $108_2$, $108_N$, respectively, to depict receiver channels being implemented by the front-end circuits 108. The front-end circuits 108 may include switches to switch between a transmission mode and a receiving mode of the front-end circuits 108. A phase shift control setting may be inputted to each phase shifter, among phase shifters $110_1$ to $110_N$, to control the phase of a RF signal being received by a connected antenna. A gain control setting may be inputted to each gain control circuit, among receiver gain control circuits $107_1$ to $107_N$, to control the gain of a RF signal being received by a connected antenna. Beam steering may be implemented by adjusting the phase shifter (e.g., phase shifter $110_1$ to $110_N$) in each one of the front-end circuits 108. The phase delays across the front-end circuits 108 may cause signals to combine coherently when they arrive at the antenna array from a specific direction, forming a receiver beam in that direction. The signal combiner is not shown for simplicity. The beam 117 may have a field pattern and beam direction that can be based on the gain and phase parameters being set in the front-end circuits 108.

received by the corresponding antenna $103_N$. The circuit 120 may determine the slope parameters 127 $\alpha_R$ and $\beta_R$ that correspond to the receiver beam 117 and may send these parameters to the circuit 112. The circuit 120 of the beam forming IC 102 may be configured to determine a phase shift parameter 122, denoted as $\Phi_i$, for each i-th antenna among the plurality of antennas 103, where i=1 . . . N. The circuit 120 may determine the phase shift parameter 122 for each antenna based on the set of receive phase slope parameters 127 and a physical location of the corresponding antenna. The circuit 120 may send the phase shift parameter 122 to the mapper 130. The mapper 130 may map the desired phase shift parameter $\Phi_i$ for each antenna to a set of corresponding front-end control settings and input these settings to each front-end 108. In an example, the control settings for front-end $108_1$ corresponding to a phase shift parameter $\Phi_1$ include a phase shifter control setting $134_1$ and a receiver gain control setting $134_1$.

Figure 2:
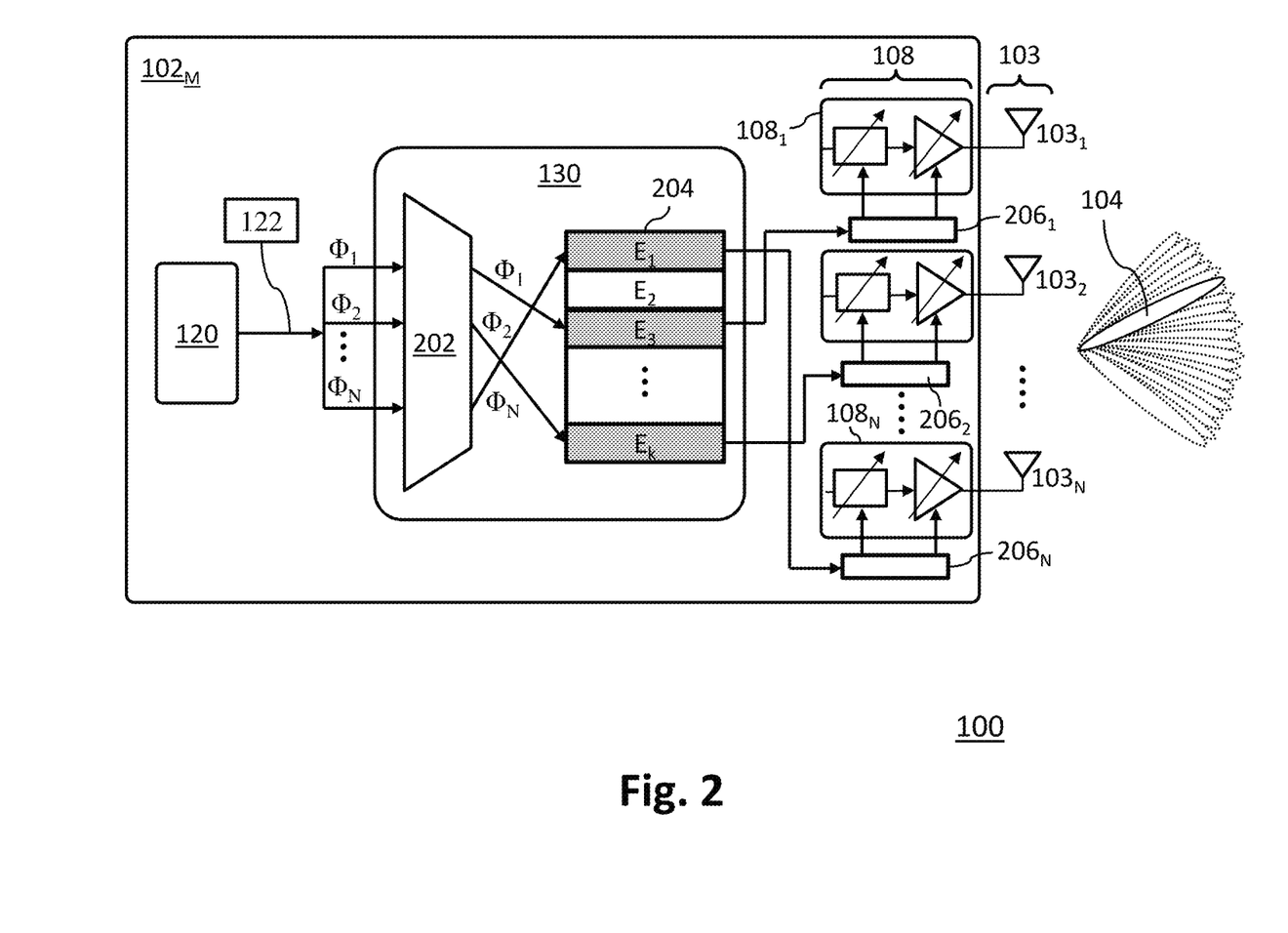
FIG. 2 illustrates an example mapper that can be used for implementing distributed calculation of beamforming parameters for phased arrays in one embodiment.

FIG. 2 illustrates an example mapper that can be used for implementing distributed calculation of beamforming parameters for phased arrays in one embodiment. In an example shown in FIG. 2, the mapper 130 may include a decoder 202 and a mapping table 204. In an example, the mapping table 204 may be implemented as a lookup table that translates different values of the phase shift parameter 122 into different control settings. In another example, the mapping table 204 may be implemented as a SRAM device storing associations between different values of the phase shift parameter 122 and different control settings. In another example, the mapping table 204 may be a data structure, or data stored in memory, or a database received from another processor or another device. The mapping table 204 may include k entries, denoted as entries $E_1$ to $E_k$, where k is less than a number of possible beam directions that can be achieved by the plurality of antennas 103. Each entry in the mapping table 204 may store a control setting including a phase control parameter and a gain control parameter.

The decoder 202 may include circuitry configured to map the phase shift parameters 122 (see FIG. 1A), denoted as $\Phi_1$ to $\Phi_N$, to entries among the mapping table 204. For example, the decoder 202 may map the phase shift parameters $\Phi_1$, $\Phi_2$, $\Phi_N$ to the entries $E_3$, $E_k$, and $E_1$, respectively. In some examples, more than one phase shift parameters 122 may be mapped to one entry in the mapping table 204. Referring to the example in FIG. 1A, the entry $E_3$ in FIG. 2 may store the gain control parameter $132_1$ and the phase control parameter $134_1$, and the entry $E_1$ in FIG. 2 may store the gain control parameter $132_N$ and the phase control parameter $134_N$. In response to the decoder 202 mapping all phase shift parameters 122 to the entries among the mapping table 204, the mapper 130 may load or distribute the control settings in the mapped entries to the front-end circuits 108. For example, the mapper 130 may load the entries $E_3$, $E_k$, and $E_1$, to the front-end circuits $108_1$, $108_2$, and $108_N$, respectively. In an example, a latch may be connected between the mapper 130 and each one of the front-end circuits 108 (e.g., total of N latches in each beam forming IC 102). For example, latches $206_1$, $206_2$, and $206_N$ may be connected between the mapper 130 and the front-end circuits $108_1$, $108_2$, and $108_N$, respectively. The latches connected between the mapper 130 and the front-end circuits 108 may facilitate a loading operation of the entries from the mapper 130 to the front-end circuits 108. For example, the entries $E_3$, $E_k$, and $E_1$ may be loaded to the front-end circuits $108_1$, $108_2$, $108_N$, sequentially (e.g., one at a time). Thus, in the example shown in FIG. 2, a first load operation may store the entry $E_3$ in the latch $206_1$, a second load operation may store the entry $E_k$ in the latch $206_2$, and a N-th load operation may store the entry $E_1$ in the latch $206_N$. In response to storing N entries in the N latches, the front-end circuits 108 may realize the phase and gain parameters necessary to produce the desired beam 104. Different combinations of entries in the mapping table 204 may result in different beam directions. Note that the mapping table 204 being shared by the front-end circuits 108 may occupy relatively less space when compared to conventional approaches that may assign one beam table to each front-end circuit.

In an example, the value of k, and the phase control parameter in the entries $E_1$ to $E_k$ in the mapping table 204, may be dependent on a desired implementation of the system 100. For example, the value of k can be 72 such that the mapping table 204 includes 72 rows or entries, and the phase control parameter in the entries $E_1$ to $E_k$ may increment at intervals of 5 degrees. For example, the phase control parameter in the entry $E_1$ may be 5 degrees, the phase control parameter in the entry $E_2$ may be 10 degrees, and the phase control parameter in the entries $E_k$ may be 360 degrees. If a phase shift parameter 122 for an i-th antenna is 15 degrees, then an entry $E_3$ having a phase control parameter of 15 degrees may be mapped to $\Phi_i$. If a phase shift parameter 122 for an i-th antenna is 50 degrees, then an entry $E_{10}$ having a phase control parameter of 50 degrees may be mapped to $\Phi_i$. If a phase shift parameter 122 for an i-th antenna is 13 degrees, then the decoder 202 or the mapper 130 may select, for example, an entry having a phase control parameter that may be closest to 13 (which in this example, may be entry $E_3$ having phase control parameter of 15 degrees). In an example, the value of k may be increased to increase the number of entries in the mapping table 204, thus providing more precise mapping of the phase shift parameter 122 to control settings in the mapping table 204.

Figure 3:
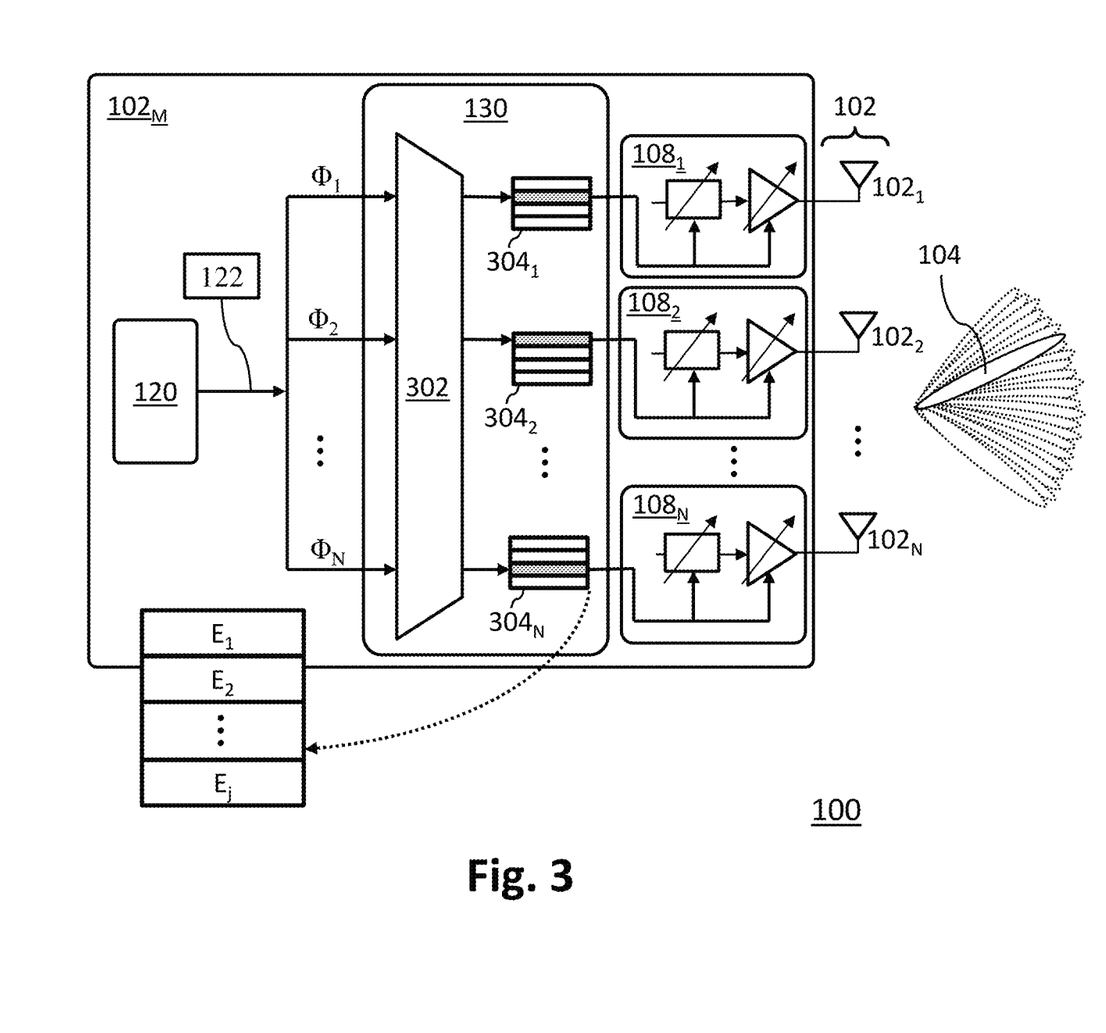
FIG. 3 illustrates another example mapper that can be used for implementing distributed calculation of beamforming parameters for phased arrays in one embodiment.

FIG. 3 illustrates another example mapper that can be used for implementing distributed calculation of beamforming parameters for phased arrays in one embodiment. In an example shown in FIG. 3, the mapper 130 may include a decoder 302 and N mapping tables, including mapping table $304_1, 304_2 \ldots 304_N$. In an example, the mapping tables $304_1$ to $304_N$ may be implemented as lookup tables that translates different values of the phase shift parameter 122 into different control settings of a specific antenna. In another example, the mapping tables $304_1$ to $304_N$ may be implemented as SRAM devices that store different values of the phase shift parameter 122 and different control settings of a specific antenna. For example, entries in the mapping table $304_1$ may translate different values of $\Phi_1$ to different control settings for the antenna $103_1$. Each one of the mapping tables $304_1$ to $304_N$ may include j entries, denoted as entries $E_1$ to $E_j$, where j is less than a number of possible beam directions that can be achieved by the plurality of antennas 103 Each entry in the mapping tables $304_1$ to $304_N$ may store a control setting including a phase control parameter and a gain control parameter for a specific antenna. For example, entries in the mapping table $304_1$ may include entries storing different values of the gain control parameter $132_1$ and phase control parameter $134_1$ for the antenna $103_1$.

The decoder 302 may include circuitry configured to map each one of the phase shift parameters 122, denoted as $\Phi_1$ to $\Phi_N$, to entries in a corresponding mapping table among the mapping tables $304_1$ to $304_N$. For example, the decoder 302 may map the phase shift parameter $\Phi_N$ to one of the entries (e.g., indicated by the shading in FIG. 3) in mapping table $304_N$. In response to the decoder 302 mapping all phase shift parameters 122 to an entry in each one of the mapping tables $304_1$ to $304_N$, the mapper 130 may load or distribute the control settings in the mapped entries to the corresponding front-end circuits 108. For example, the mapper 130 may load the entry mapped to $\Phi_1$ in the mapping table $304_1$ (e.g., the shaded entry in FIG. 3) to the front-end circuit $108_1$. Different combinations of entries from each one of the mapping tables $304_1$ to $304_N$ may result in different beam directions. Note that the mapping tables $304_1$ to $304_N$ may be smaller than conventional beam tables that map one entry to one beam direction. Thus, the embodiment shown in FIG. 3 may provide smaller mapping tables and also may provide compensation of potential element-to-element mismatches within the beam forming ICs 102 since each front end has an individual set of mapping values stored in the corresponding tables $304_1$ to $304_N$.

In an example, the value of j, and the phase control parameter in the entries $E_1$ to $E_j$ in the mapping tables $304_1$ to $304_N$, may be dependent on a desired implementation of the system 100. For example, the value of j can be 72 such that each one of the mapping tables $304_1$ to $304_N$ includes 72 rows or entries, and the phase control parameter in the entries $E_1$ to $E_3$ may increment at intervals of 5 degrees. For example, the phase control parameter in the entry $E_1$ may be 5 degrees, the phase control parameter in the entry $E_2$ may be 10 degrees, and the phase control parameter in the entries $E_3$ may be 360 degrees. If a phase shift parameter 122 for an i-th antenna is 15 degrees (e.g., $\Phi_i=15$), then an entry $E_3$ in the mapping table 304, having a phase control parameter of 15 degrees may be mapped to $\Phi_i$. If a phase shift parameter 122 for an i-th antenna is 50 degrees, then an entry $E_{10}$ in the mapping table 304$_i$ having a phase control parameter of 50 degrees may be mapped to $\Phi_i$. If a phase shift parameter 122 for an i-th antenna is 13 degrees, then the decoder 302 or the mapper 130 may select, for example, an entry in the mapping table 304$_i$ having a phase control parameter that may be closest to 13. In an example, the value of j may be increased to increase the number of entries in the mapping tables 304$_1$ to 304$_N$, thus providing more precise mapping of the phase shift parameter 122 to control settings in the mapping tables 304$_1$ to 304$_N$.

The methods and systems described herein may use smaller mapping tables for large phased arrays, such as mapping tables that have a number of entries being smaller than a number of possible beam directions that can be formed by a phased array. For example, each entry among the mapping tables (e.g., 204 and 304$_1$ to 304$_N$) shown in FIG. 2 and FIG. 3 may be mapped to different values of an ideal phase shift parameter (e.g., $\Phi_1$) instead of being mapped to one beam direction. Thus, the size of the mapping tables may not be dependent on the number of antenna elements or the number of beam directions. For example, the number of entries in the mapping tables of the system 100 may be less than the number of possible beam directions. Further, the ideal phase shift parameter may be determined based on physical locations of the antennas, allowing the methods and systems to be implemented in phased array systems having different operating frequencies or phase shifter implementations. Furthermore, phase slope parameters (e.g., $\alpha$ and $\beta$) that may require nonlinear calculations are distributed to an off-chip device, where computing resources may be more abundant than the beam forming IC. Thus, latency, and power consumption, and input/output (I/O) operations between the off-chip device and the beam forming IC, may be reduced since the values of the phase slope parameters may be broadcasted to multiple beam forming chips using a single clock transaction.

Figure 4A:
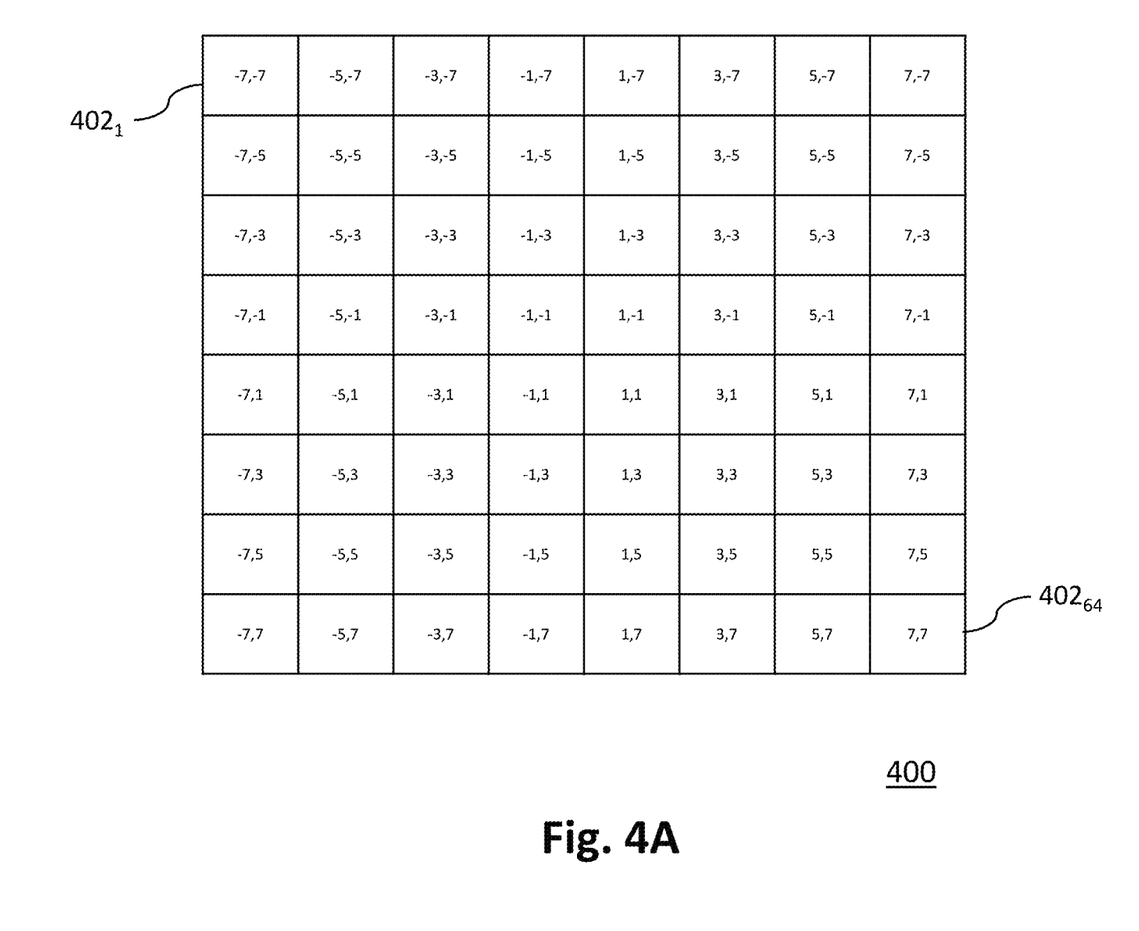
FIG. 4A illustrates an example antenna pattern relating to an implementation of distributed calculation of beamforming parameters for phased arrays in one embodiment.
Figure 4B:
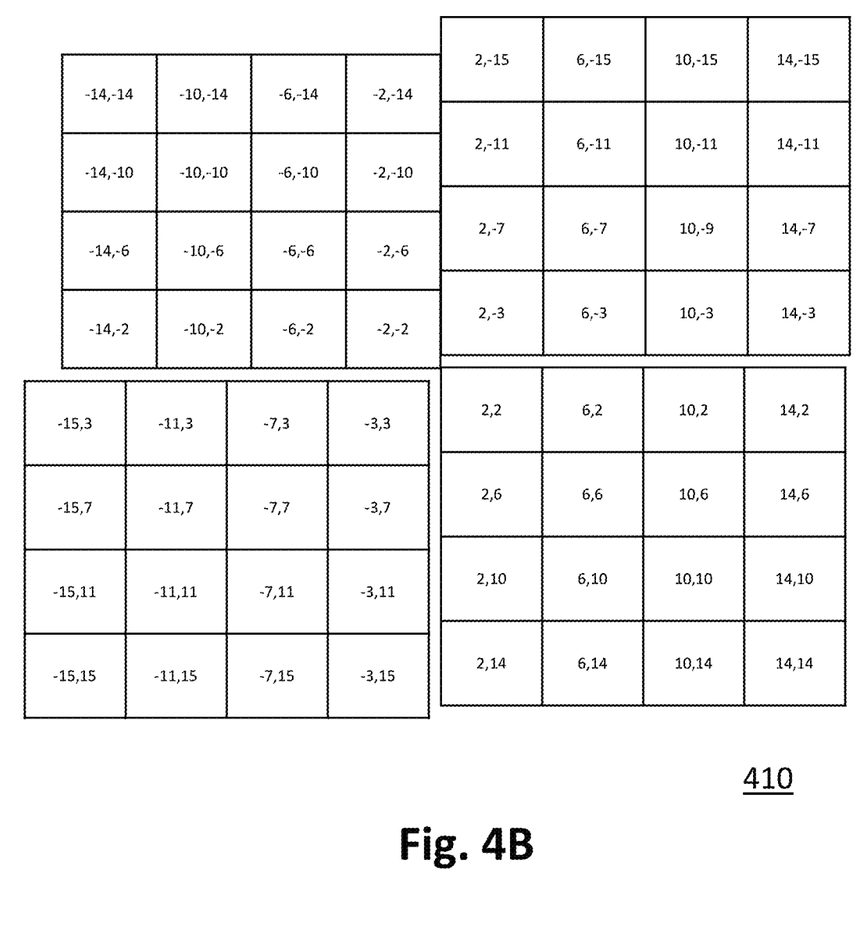
FIG. 4B illustrates an example antenna pattern relating to an implementation of distributed calculation of beamforming parameters for phased arrays in one embodiment.
Figure 4C:
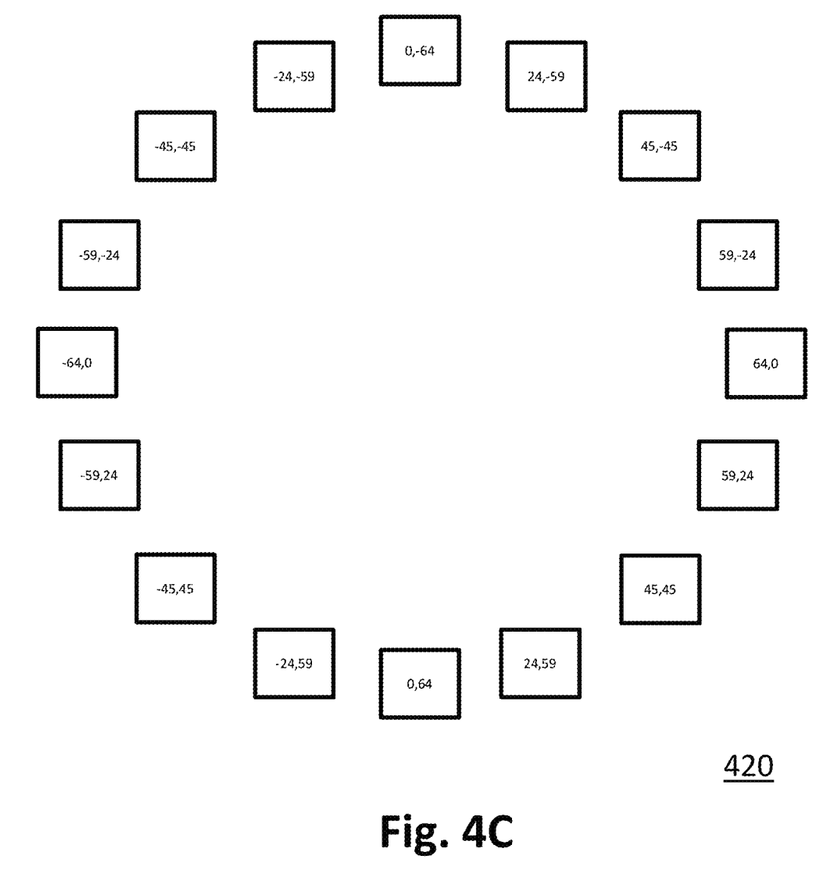
FIG. 4C illustrates an example antenna pattern relating to an implementation of distributed calculation of beamforming parameters for phased arrays in one embodiment.

FIG. 4A to FIG. 4C illustrate examples of antenna patterns relating to an implementation of distributed calculation of beamforming parameters for phased arrays in one embodiment. In an example, the plurality of antennas 103 of FIG. 1A to FIG. 3 may have the antenna pattern 400 shown in FIG. 4A. The antenna pattern 400 may be a 8×8 uniform array having 64 antennas (e.g., N=64). An antenna 402$_1$ may be located at a position (−7, −7), or x=−7 and y=−7, An antenna 402$_{64}$ may be located at a position (7, 7), or x=7 and y=7. These position values may be used for the calculation of the phase shift parameter 122 (see FIG. 1A). Further, these position values may represent positions of the antennas among the plurality of antennas 103 normalized to a resolution or an antenna pitch of the antenna pattern 400. For example, the antenna pattern 400 may have a resolution of 0.5λ (λ, being the wavelength of the desired beam 104), and a number of bits in the fractional representation of the antenna positions of the antenna pattern 400 can be 1. The calculation of the phase shift parameter 122 may not be affected by changes in the resolution since the exact positions of the antennas are being used for the calculation. However, changes in the number of bits in the fractional representation of the antenna positions may affect the calculation of the phase shift parameter 122 since the antenna positions may change.

For example, another antenna pattern 410 is shown in FIG. 4B. The antenna pattern 410 may be a 8×8 array with multiple 4×4 sub-arrays having different spacing from one another. The antenna pattern 410 may have a resolution of 0.25, and a number of bits in the fractional representation of the antenna positions of the antenna pattern 410 can be 2. Another antenna pattern 420 is shown in FIG. 4C. The antenna pattern 420 may be a circular array with a normalized radius of 4λ (λ, being the wavelength of the desired beam 104). The pitch for the antennas in the antenna pattern 420 may also be variable. The antenna pattern 420 may have a resolution of 0.0625, and a number of bits in the fractional representation of the antenna positions of the antenna pattern 420 can be 4. The pitch for the antennas in the antenna pattern 410 may be variable. However, the calculation of the phase shift parameter 122 may not be affected by the variable pitch because any adjusted antenna position may be used in the calculation.

Figure 5:
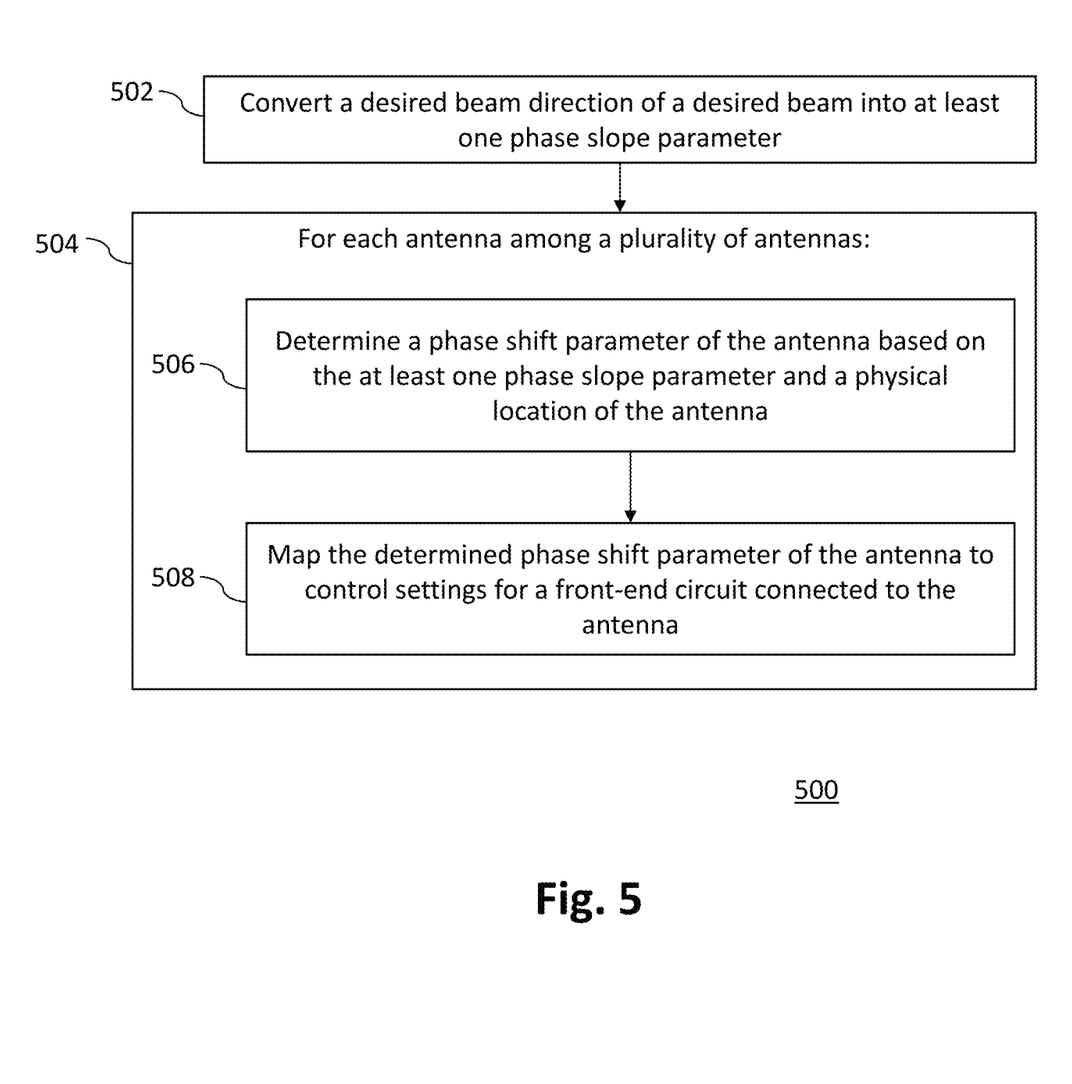
FIG. 5 illustrates a flow diagram relating to distributed calculation of beamforming parameters for phased arrays in one embodiment.

FIG. 5 illustrates a flow diagram relating to distributed calculation of beamforming parameters for phased arrays in one embodiment. The process 500 in FIG. 5 may be implemented using, for example, computer system 100 discussed above. An example process may include one or more operations, actions, or functions as illustrated by one or more of blocks 502, 504, 506, and/or 508. Although illustrated as discrete blocks, various blocks may be divided into additional blocks, combined into fewer blocks, eliminated, performed in different order, or performed in parallel, depending on the desired implementation.

The process 500 may begin at block 502, where a first circuit in a system may convert a desired beam direction of a desired beam into at least one phase slope parameter. The phased array may include a plurality of antennas connected to a plurality of front-end circuits of a beam forming circuit, and each antenna may be connected to a respective front-end circuit. In an example, the first circuit may convert the desired beam direction into a first phase slope parameter based on a beam angle of the desired beam, a wavelength of the desired beam, and a minimum unit spacing between the plurality of antennas in a first direction of a two-dimensional plane. The first circuit may further convert the desired beam direction into a second phase slope parameter based on the beam angle of the desired beam, the wavelength of the desired beam, and spacing between the plurality of antennas in a second direction of the two-dimensional plane.

The process 500 may proceed from block 502 to block 504. Block 504 may include blocks 506 and 508, where blocks 506 and 508 are performed for each antenna among the plurality of antennas. At block 506, a second circuit may determine a phase shift parameter of the antenna based on the at least one phase slope parameter and a physical location of the antenna. The process 500 may proceed from block 506 to block 508. At block 508, the second circuit may map the determined phase shift parameter of the antenna to control settings for a front-end circuit connected to the antenna. In an example, the second circuit may use a mapping table that stores different values of phase control parameters for the plurality of front-end circuits to map the phase shift parameter of the antennas to the control settings. A combination of phase control parameters from the mapping table may be used for configuring the plurality of front-end circuits to cause the phased array to form the desired beam having the desired beam direction. In an example, the mapping table may be stored in a memory device connected to the plurality of front-end circuits. In an example, a number of entries in the mapping table may be less than a number of possible beam directions of beams being formed by the phased array. In an example, a latch or memory register coupled to each front-end is used to store the front-end control settings determined by the mapper.

In another example, the second circuit may use a plurality of mapping tables that store different values of phase control parameters for the plurality of front-end circuits to map the phase shift parameter of the antennas to the control settings. A combination of phase control parameters from the plurality of mapping tables may be used for configuring the plurality of front-end circuits to cause the phased array to form the desired beam having the desired beam direction, where each phase control parameter among the combination of phase control parameters may be from a corresponding mapping table. In an example, the plurality of mapping tables may be stored in a plurality of memory devices connected to the plurality of front-end circuits. In an example, a number of entries in each mapping table among the plurality of mapping tables may be less than a number of possible beam directions of beams being formed by the phased array.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for operating a phased array, the method comprising:
   converting, by a processor of a wireless communication device, a desired beam direction of a desired beam into a first phase slope parameter and a second phase slope parameter corresponding to the desired beam, the phased array comprising a plurality of antennas connected to a plurality of front-end circuits of a beam forming circuit of the wireless communication device, each antenna being connected to a respective front-end circuit, wherein the first phase slope parameter and the second phase slope parameter corresponding to the desired beam depend on a beam angle of the desired beam, a wavelength of the desired beam and minimum unit spacing between the plurality of antennas;
   determining, by the beam forming circuit, a plurality of phase shift parameters for the plurality of antennas based on the first and second phase slope parameters corresponding to the desired beam and physical locations of the plurality of antennas, wherein the plurality of phase shift parameters are different from the first and second phase slope parameters corresponding to the desired beam, a number of phase shift parameters is equivalent to a number of antennas, and a phase shift parameter for an antenna represents a phase shift required for the antenna to contribute to forming the desired beam;
   searching, by the beam forming circuit, in a mapping table to identify a plurality of control settings that are mapped to the plurality of phase shift parameters, wherein an identified control setting mapped to a phase shift parameter for an antenna comprises a phase shifter setting and a gain control circuit setting for the antenna, the phase shifter setting for the antenna is different from the phase shift parameter of the antenna, and the phase shifter setting for the antenna causes the antenna to perform an actual phase shift according to the phase shifter setting in the identified control setting, and a number of control settings being identified is equivalent to the number of phase shift parameters;
   distributing, by the beam forming circuit, the plurality of control settings mapped to the plurality of phase shift parameters from the mapping table to the plurality of front-end circuits; and
   configuring, by the plurality of front-end circuits, the phased array using the plurality of control settings mapped to the plurality of phase shift parameters to cause the phased array to form the desired beam having the desired beam direction.

2. The method of claim 1, further comprising:
   configuring the plurality of front-end circuits using a combination of different phase shifter settings from the mapping table to cause the phased array to form the desired beam having the desired beam direction.

3. The method of claim 1, wherein the mapping table is stored in a memory device connected to the plurality of front-end circuits.

4. The method of claim 1, wherein:
   the mapping table comprises a plurality of lookup tables, and each one of the plurality of lookup tables stores different values of phase shifter settings for the plurality of front-end circuits; and
   the method further comprising configuring the plurality of front-end circuits using a combination of different phase shifter settings from the plurality of lookup tables to cause the phased array to form the desired beam having the desired beam direction, wherein each phase shifter setting among the combination of different phase shifter settings is from a corresponding mapping table.

5. The method of claim 4, wherein the plurality of lookup tables are stored in a plurality of memory devices connected to the plurality of front-end circuits.

6. The method of claim 1, wherein converting the desired beam direction into the first and second phase slope parameters comprises:
converting the desired beam direction into the first phase slope parameter based on the beam angle of the desired beam, the wavelength of the desired beam, and minimum unit spacing between the plurality of antennas in a first direction of a two-dimensional plane; and
converting the desired beam direction into the second phase slope parameter based on the beam angle of the desired beam, the wavelength of the desired beam, and a minimum unit spacing between the plurality of antennas in a second direction of the two-dimensional plane.

7. The method of claim 1, wherein searching in the mapping table comprises using at least one mapping table that stores different values of phase shifter settings for the plurality of front-end circuits, and a number of entries in each one of the at least one mapping table is less than a number of possible beam directions of beams being formed by the phased array.

8. A system comprising:
a processor;
a beam forming circuit connected to the processor, the beam forming circuit comprising a plurality of front-end circuits;
a phased array including a plurality of antennas connected to the plurality of front-end circuits of the beam forming circuit;
the processor being configured to:
convert a desired beam direction of a desired beam into a first phase slope parameter and a second phase slope parameter corresponding to the desired beam, wherein the first phase slope parameter and the second phase slope parameter corresponding to the desired beam depend on a beam angle of the desired beam, a wavelength of the desired beam and minimum unit spacing between the plurality of antennas;
send the first and second phase slope parameters to the beam forming circuit;
the beam forming circuit being configured to:
receive the first and second phase slope parameters;
determine plurality of phase shift parameters for the plurality of antennas based on the first and second phase slope parameters corresponding to the desired beam and physical locations of the plurality of antennas, wherein the plurality of phase shift parameters are different from the first and second phase slope parameters corresponding to the desired beam, a number of phase shift parameters is equivalent to a number of antennas, and a phase shift parameter for an antenna represents a phase shift required for the antenna to contribute to forming the desired beam;
search in a mapping table to identify a plurality of control settings that are mapped to the plurality of phase shift parameters wherein an identified control setting mapped to a phase shift parameter for an antenna comprises a phase shifter setting and a gain control circuit setting for the antenna, the phase shifter setting for the antenna is different from the phase shift parameter of the antenna, and the phase shifter setting for the antenna causes the antenna to perform an actual phase shift according to the phase shifter setting in the identified control setting, and a number of control settings being identified is equivalent to the number of phase shift parameters;
distribute the plurality of control settings mapped to the plurality of phase shift parameters from the mapping table to the plurality of front-end circuits; and
the plurality of front-end circuits being configured to control the phased array using the plurality of control settings mapped to the plurality of phase shift parameters to cause the phased array to form the desired beam having the desired beam direction.

9. The system of claim 8, wherein:
the beam forming circuit comprises a memory device connected to the plurality of front-end circuits; and
the memory device being configured to store the mapping table.

10. The system of claim 8, wherein the beam forming circuit is further configured to:
configure the plurality of front-end circuits using a combination of phase shifter settings from the mapping table to cause the phased array to form the desired beam having the desired beam direction.

11. The system of claim 8, wherein:
the beam forming circuit comprises a plurality of memory devices connected to the plurality of front-end circuits, each memory device being connected to one front-end circuit; and
each one of the plurality of memory devices being configured to store the mapping table.

12. The system of claim 11, wherein the beam forming circuit is further configured to configure the plurality of front-end circuits using a combination of different phase shifter settings from mapping tables connected to the plurality of memory devices, wherein each phase shifter setting among the combination of different phase shifter settings is from a corresponding mapping table.

13. The system of claim 8, further comprising a memory device configured to store physical locations of the plurality of antennas.

14. The system of claim 8, wherein the beam forming circuit comprises at least one memory device configured to store at least one mapping table that stores different values of phase shifter settings for the plurality of front-end circuits, the at least one memory device being connected to the plurality of front-end circuits, and a number of entries in each one of the at least one mapping table is less than a number of possible beam directions of beams being formed by the phased array.

15. An apparatus comprising:
a plurality of antennas;
a beam forming circuit including a plurality of front-end circuits connected to the plurality of antennas, the beam forming circuit being configured to receive a first phase slope parameter and a second phase slope parameter corresponding to a desired beam from a device and physical locations of the plurality of antennas, the first and second phase slope parameters corresponding to the desired beam depend a beam angle of the desired beam, a wavelength of the desired beam and minimum unit spacing between the plurality of antennas;
the beam forming circuit being configured to:
determine a plurality of phase shift parameters for the plurality of antennas based on the first and second phase slope parameters corresponding to the desired beam and physical locations of the plurality of antennas, wherein the plurality of phase shift parameters are different from the first and second phase slope parameters corresponding to the desired beam, a number of phase shift parameters is equivalent to a number of antennas, and a phase shift parameter for an antenna represents a phase shift required for the antenna to contribute to forming the desired beam; and search in a mapping table to identify a plurality of control settings that are mapped to the plurality of phase shift parameters, wherein an identified control setting mapped to a phase shift parameter for an antenna comprises a phase shifter setting and a gain control circuit setting for the antenna, the phase shifter setting for the antenna is different from the phase shift parameter of the antenna, and the phase shifter setting for the antenna causes the antenna to perform an actual phase shift according to the phase shifter setting in the identified control setting, and a number of control settings being identified is equivalent to the number of phase shift parameters;

distribute the plurality of control settings mapped to the plurality of phase shift parameters from the mapping table to the plurality of front-end circuits; and the plurality of front-end circuits being configured to control the plurality of antennas using the plurality of control settings mapped to the plurality of phase shift parameters to cause the plurality of antennas to form the desired beam having the desired beam direction.

16. The apparatus of claim 15, wherein:
the beam forming circuit comprises a memory device connected to the plurality of front-end circuits; and the memory device being configured to store the mapping table.

17. The apparatus of claim 16, wherein the beam forming circuit being configured to:
configure the plurality of front-end circuits using a combination of different phase shifter settings from the mapping table to form the desired beam having the desired beam direction.

18. The apparatus of claim 15, wherein:
the beam forming circuit comprises a plurality of memory devices connected to the plurality of front-end circuits, each memory device being connected to one front-end circuit; and
each one of the plurality of memory devices being configured to store the mapping table.

19. The apparatus of claim 18, wherein the beam forming circuit is configured to configure the plurality of front-end circuits using a combination of different phase shifter settings from mapping tables connected to the plurality of memory devices, wherein each phase shifter setting among the combination of different phase shifter settings is from a corresponding mapping table.

20. The apparatus of claim 15, wherein the beam forming circuit comprises at least one memory device configured to store at least one mapping table that stores different values of phase shifter settings for the plurality of front-end circuits, the at least one memory device being connected to the plurality of front-end circuits, and a number of entries in each one of the at least one mapping table is less than a number of possible beam directions of beams being formed by the beam forming circuit.

* * * * *